(12) United States Patent
Barlet-Gouedard et al.

(10) Patent No.: US 6,511,537 B1
(45) Date of Patent: Jan. 28, 2003

(54) RETARDING SYSTEMS AND APPLICATION TO OIL WELL CEMENTING

(75) Inventors: Véronique Barlet-Gouedard, Chatenay Malabry (FR); Fabien J. Brand, Paris (FR); Pierre Maroy, Buc (FR); Frederik Nilsson, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/623,374

(22) PCT Filed: Feb. 25, 1999

(86) PCT No.: PCT/EP99/01302

§ 371 (c)(1), (2), (4) Date: Oct. 20, 2000

(87) PCT Pub. No.: WO99/44962

PCT Pub. Date: Sep. 10, 1999

(30) Foreign Application Priority Data

Mar. 4, 1998 (FR) .............................................. 98 02586

(51) Int. Cl.$^7$ .............................................. C04B 14/00
(52) U.S. Cl. .................. 106/727; 106/638; 106/639; 106/665; 106/678; 106/680; 106/713; 106/717; 106/810; 106/808; 106/819; 106/823
(58) Field of Search ................................ 106/638, 639, 106/664, 665, 678, 680, 713, 717, 727, 810, 808, 819, 823

(56) References Cited

U.S. PATENT DOCUMENTS

| 4,468,252 A | * | 8/1984 | Crump et al. ................ 106/717 |
| 4,500,356 A | * | 2/1985 | Crump et al. ................ 106/717 |
| 4,676,832 A | * | 6/1987 | Childs et al. ................ 106/727 |
| 4,964,917 A | * | 10/1990 | Bobrowski et al. ......... 106/708 |
| 5,340,397 A | * | 8/1994 | Brothers ....................... 106/714 |
| 5,413,819 A | * | 5/1995 | Drs ............................. 106/713 |
| 5,494,516 A | * | 2/1996 | Drs et al. .................... 106/802 |
| 5,571,318 A | * | 11/1996 | Griffith et al. .............. 106/725 |
| 5,594,050 A | * | 1/1997 | Audebert et al. ............. 524/2 |

* cited by examiner

Primary Examiner—Elizabeth D. Wood
(74) Attorney, Agent, or Firm—Thomas O. Mitchell; Catherine Menes; Brigitte Jeffery

(57) ABSTRACT

Systems for retarding setting in an oilfield well cement slurry comprise a solution of a phosphonate selected from methylene phosphonic acid derivatives and a phosphate, in particular selected from the following salts or the corresponding acids: mono-phosphates (ortho-phosphates $PO_4^{2}$; meta-phosphates $PO_3$), acyclic poly-phosphates (pyrophosphates $P_2O_7^{4}$, tripolyphosphates $P_3O_{10}^{5}$) or cyclic poly-phosphates. The system preferably may also comprise a retarder booster and is more particularly applicable to cementing at low or medium temperatures.

20 Claims, No Drawings

RETARDING SYSTEMS AND APPLICATION TO OIL WELL CEMENTING

The present invention relates to drilling techniques for oil, gas, water, geothermal or analogous wells. More precisely, the invention relates to an additive, and to compositions including the additive, for cement slurries, more particularly for cementing a casing in an oil well or the like.

After drilling an oil well or the like, a casing or a coiled tubing is lowered into the well and cemented over all or a portion of its length. Cementing can in particular prevent fluids being exchanged between the different formation layers through which the well passes, it can prevent gas from rising via the annular space surrounding the casing, or it can limit the ingress of water into the production well. Of course, it also has the principal aim of consolidating the well and protecting the casing.

While a cement slurry is being prepared, then injected into the well, and finally positioned in the zone to be cemented, it must have relatively low viscosity and practically constant rheological properties. In contrast, once it is in position, an ideal cement would rapidly develop high compressive strength so as to enable other work in the well under construction to be resumed, in particular to enable drilling to be continued.

In practice, practically all cementing slurries are formulated with an additive which retards setting of the cement, normally known as a retarder. The most widely used retarders are lignosulfates, hydroxycarboxylic acids such as citric acid, glucoheptonic acid or gluconic acid, saccharides or polysaccharides such as carboxymethylhydroxyethyl cellulose, and organophosphates.

In practice, selecting a retarder depends on the temperature at the well bottom, the cement slurry circulation temperature, and the presence or absence of other additives with which the retarders may be incompatible. The majority of known retarders are effective only in a relatively narrow temperature range, a fact which is more critical as the temperatures to which the cement slurries are subjected are not always precisely known. A further difficulty is high sensitivity to variations in concentrations of retarder or of other additives, and occasionally also to the cements used.

Under such conditions, formulating a cement slurry which is suitable for every eventuality remains a particularly difficult art, all the more so since oil well cements are, by their very definition, used on sites which are usually far from the facilities of an industrial laboratory and which generally do not have access to the complete range of available additives.

The present invention aims to provide a novel retarding system which is suitable for low/medium temperature applications, namely typically 70° C. to 140° C., and which is compatible with additives which are currently used for oilfield cements such as latexes, chemically cross-linked polyvinyl alcohol type fluid loss control agents (in particular those described in U.S. Pat. No. 5,594,050) and for which the effect on a cement slurry is readily predictable, and in particular which has low sensitivity to variations in cement quality.

This aim is satisfied in the present invention by a system constituted by a solution of a phosphonate selected from derivatives of methylene phosphonic acid, and a phosphate.

The phosphates may be mono-phosphates (ortho-phosphates $PO_4$, meta-phosphates $PO_3$) or acyclic poly-phosphates (pyrophosphates $P_2O_7^{4-}$, tripolyphosphates $P_3O_{10}^{5-}$), or cyclic poly-phosphates. Salts can also be used, for example, preferably sodium or potassium salts, or the acids (if they exist) of the following compounds: orthophosphoric acid $H_3PO_4$, sodium dihydrogen phosphate $NaH_2PO_4$, sodium monohydrogen phosphate $Na_2HPO_4$, trisodium phosphate $Na_3PO_4$, pyrophosphoric acid $H_4P_2O_7$, sodium tripolyphosphate $Na_5P_3O_{10}$, and sodium cyclotrimetaphosphate $Na_3P_3O_9$.

The preferred retarding system of the invention is obtained with a calcium and sodium salt of ethylenediamine-N,N,N',N'-tetrakis(methylene) phosphonic acid or the pentasodium salt of ethylenediamine tetra (methylenephosphonic) acid, associated with an orthophosphate.

The phosphonate to phosphate weight ratio is preferably in the range 2 to 4, more preferably in the range 3 to 3.5.

The retarding system of the invention is suitable for applications between 50° C. and about 140° C. In a variation of the invention, the retarding system also comprises a retarder booster which can extend the range of application of the retarder of the invention to medium temperatures. For reasons of increased compatibility with other additives, and in particular fluid loss control additives, it is preferable to use as a retarder booster a mixture of lignosulfates and hydroxycarboxylic acids (such as gluconates), but other conventional hydroxycarboxylic acid-based retarder boosters or lignosulphates can also be used. It should be noted that these retarder boosters are themselves retarders but of quite low efficiency and thus are usually used in combination with other retarders. In this optimised variation of the invention, the retarding system is constituted by 40% to 45% of orthophosphoric acid, 10% to 15% of the calcium and sodium salt of ethylenediamine-N,N,N',N'-tetrakis (methylene)phosphonic acid and 40% to 50% of retarder booster, the percentages being by weight.

The retarding system of the invention can also contain a biopolymer which can improve the rheology of the cement slurry by minimizing settling problems for systems with a high concentration of the retarding system.

In contrast to the numerous conventional retarders, the retarding system of the invention is advantageously compatible with different types of fluid loss control agents or gas migration agents, in particular with latexes, and can be used in slurries in which seawater is used as the mixing water.

The following examples illustrate the invention without limiting its scope.

Except where otherwise indicated, the tests were carried out using a system comprising a calcium/sodium salt of ethylenediamine tetramethylene phosphonic acid comprising (2.5 calcium per 3 sodium per mole) which is commercially available from MONSANTO under the trade name DEQUEST 2047 (the "phosphonate") and an orthophosphoric acid from PROLABO (the phosphate or $H_3PO_4$) with a purity of 99.999%, in 85% solution in water. The cement used was a class G oilfield cement (Dickerhoff North G).

EXAMPLE 1

60 ml of a cement slurry was prepared with a density of 1.893 g/cm³, and with a water/cement volume ratio of 0.44. The phosphonate and phosphate were added to the mixing water before the cement. After stirring for 35 seconds at 4000 revolutions per minute, 3.5 g of slurry was weighed out and introduced into a calorimeter at 85° C. The time between introduction into the calorimeter and the maximum hydration peak was measured as a function of the percentage (calculated from the weight of cement) of phosphonate and orthophosphoric acid and is shown in Table 1.

TABLE I

| N° | % phosphonate | % H$_3$PO$_4$ | Time |
|---|---|---|---|
| 1 | 0 | 0 | 3:20 |
| 2 | 0.05 | 0 | 5:00 |
| 3 | 0.075 | 0 | 3:45 |
| 4 | 0.05 | 0.1 | 11:00 |
| 5 | 0.05 | 0.15 | 4:10 |
| 6 | 0.05 | 0.05 | 5:20 |
| 7 | 0 | 0.15 | 3:45 |
| 8 | 0 | 1.2 | 1:15 |

While the calorimetric tests only indirectly reflect cement setting, it can be seen that in the absence of phosphonate, the orthophosphate acts as an accelerator or a very slight retarder depending on the concentration and temperature.

The phosphonate alone acts as a retarder up to a certain threshold but there is clearly a synergistic effect when the phosphonate is used in combination with the orthophosphate. This table also shows the need for optimisation of the phosphonate/phosphate ratio.

EXAMPLE 2

The same protocol was used, this time using mixtures of phosphonate and pyrophosphoric acid for setting at 85° C.

TABLE II

| N° | % phosphonate | % H$_4$P$_2$O$_7$ | Time (hh:min) | Intensity (mW) |
|---|---|---|---|---|
| 9 | 0 | 0 | 3:30 | 175 |
| 10 | 0.1 | 0 | 11:40 | 105 |
| 11 | 0.1 | 0.0004 | 16:00 | 80 |
| 12 | 0.1 | 0.0006 | 11:30 | 90 |
| 13 | 0.1 | 0.0012 | 13:10 | 85 |

In similar fashion to orthophosphoric acid, Table II above shows that there is a critical ratio at which a synergistic effect exists between the retarding effect of the phosphonate and the retarding effect of the phosphate.

EXAMPLE 3

The tests were repeated at 111° C. (231° F.) and by adding 35% (by weight of cement) of silica flour as is usual from such temperatures to prevent retrogression of the compressive strength and an increase in the permeability of the set cement. The water to cement ratio was kept at 0.44, the slurry density was 1.797 g/cm$^3$. The same protocol as that described above was used except that the silica flour was mixed with water for 15 seconds before cement addition was commenced.

In Table III below, a* after the time indicates the presence of two hydration peaks, the maximum peak reported here corresponding to the second hydration peak. A stark reduction in peak intensity (of the order of 50% or more) could be associated with setting spread over a long period, which is not desirable for a good retarding system.

TABLE III

| Test | % phosphonate | % H$_3$PO$_4$ | Time (hh:min) | Intensity (mW) |
|---|---|---|---|---|
| 14 | 0 | 0 | 2:05 | 125 |
| 15 | 0.05 | 0 | 3:20 | 105 |
| 16 | 0.075 | 0 | 4:10 | 100 |
| 17 | 0.2 | 0 | 6:40* | 70 |
| 18 | 0.4 | 0 | 10:00 | 2 |
| 19 | 0 | 0.1 | 2:30* | 105 |
| 20 | 0 | 1.2 | 1:10* | 95 |
| 21 | 0.05 | 0.05 | 2:30* | 110 |
| 22 | 0.05 | 0.15 | 2:30* | 90 |
| 23 | 0.05 | 1.2 | 1:25* | 100 |
| 24 | 0.2 | 0.008 | 5:30* | 90 |

It can be seen that the orthophosphate retained a very strong accelerating effect, even at relatively low concentrations. As the phosphonate concentration increased, the intensity of the principal hydration peak strongly diminished until it practically disappeared, i.e., the cement no longer set but behaved as a gel.

These calorimeter cell tests have thus shown that a synergistic effect exists for the retarding effect when the phosphonate/phosphate ratio equals a certain value. They also show that there is a critical threshold for the concentration of phosphonate in the cement slurry, above which threshold cement setting is affected.

EXAMPLE 4

Following the calorimetric tests, the authors of the present invention sought to optimize a three-component retarding system: a phosphonate (the calcium/sodium salt of ethylenediamine tetramethylene phosphonic acid used in the preceding examples), orthophosphoric acid and a retarder booster comprising 11.5% (by weight) of sodium gluconate, 76% of modified sodium lignosulfonate and 6.5% of tartaric acid.

These tests were carried out in 3 temperature ranges: between 68° C. and 91° C. (low temperature range); between 91° C. and 113° C. (medium temperature range) and between 113° C. and 138° C. (high temperature range).

It should be noted that these temperatures correspond to temperatures at a well bottom of a slurry pumped from the surface. It should also be noted that this temperature is normally lower than the temperature at which cement setting occurs such that in practice, the compressive strengths of the set cement in the well are higher than the values measured during these tests. These temperature ranges are encountered in low or medium temperature wells.

The experimental data are shown in Tables IV, V and VI below in which the concentration of retarder (active matter) is given with respect to the weight of cement. The proportions by weight of orthophosphoric acid and phosphonate were varied between 10% and 62% and 1% and 31% respectively (the percentage by weight of retarder booster, being the complement to 100% not being shown in these tables). For all of the test slurries, the quantity of water was adjusted to obtain a fixed density of 1.89 g/cm$^3$.

For the low temperature tests, 0.03% (with respect to the weight of cement) of a biopolymer. and 0.1 gallons per sack of cement of a normal dispersing agent, in this case an aqueous solution of polynaphthalane sulfonate (PNS), were added, (i.e., 0.1 U.S. gallons (3.78 litres) per 42 kilogram sack, 0.1 gps=9 cm$^3$/Kg of cement).

The medium and high temperature tests were carried out without adding polynaphthalene sulfonate but with 0.065% of biopolymer (such as "BIOZAN" produced by the Kelco Oilfield Group), acting as an anti-settling agent. Further, compositions comprising 35% (with respect to the weight of cement) of silica flour were used for these tests.

The slurries were prepared and the measurements carried out using protocols recommended by the API (American Petroleum Institute), using the following order for adding the additives: preparing the mixing water by successive addition of phosphonate, orthophosphoric acid, if necessary an antifoam agent and the dispersing agent, then adding a premixed dry solid material mixture (cement, biopolymer and silica flour).

The thickening time corresponded to the production of a consistency of 100 BC, measured in standardized BC units. The transition time corresponded to passing from a consistency of 30 BC to a consistency of 100 BC.

The time required to attain a compressive strength of 50 psi (pounds force per square inch) (i.e., 345 kPascals) and 500 psi (3450 kpascals) was also measured for each slurry. Further, the compressive strength after 24 hours was measured (1 psi=6.894 kPascals). A value of the order of 2000 psi (13.8 Mpascals) after 24 hours is generally judged to be satisfactory for the envisaged applications.

A further series of measurements was made on the slurry rheology, at the mixing temperature and at the circulation temperature T in the well for temperatures below 85° C. or at 85° C. for higher temperatures. The data measured in this instance were the plastic viscosity (in milliPascals second or centiPoises) and the yield point (expressed, as is customary in this art, in lbf/100ft$^2$=0.4787 Pascals). Compositions with low viscosity and low yield point are desirable.

Measurements were also carried out on the gel strength developed when the composition was left to rest for 10 minutes (in lbf/100ft$^2$). These measurements were carried out at the temperature of slurry circulation at the well bottom. Because the formulations in Tables VI and VII contained no dispersing agent, the relatively high gel values obtained after 10 minutes of rest are not significant. Further, the gel was easily broken up as shown by the results after one minute's stirring at 3 revolutions per minute (gel+i minute).

Finally, the last column shows the volume of free water (indicating settling in certain phases of the slurry) formed for 250 ml of slurry (values approaching zero were desirable).

These tests enabled a preferred ternary retarding system to be selected which comprised between 39% and 45% of orthophosphoric acid, 10% to 15% of phosphonate and 40% to 51% of retarder booster, (modified sodium lignosulfonate/ sodium gluconate). With this optimum composition, the retarding effect on cement setting was good, with a relatively monotonic response depending on the concentration of the retarder added, and relatively low sensitivity to temperature variations; low sensitivity to shear (characterized by a short time between the time to obtain 100 BC and that to obtain 50 psi) and rapid development of compressive strength (rapid passage from 50 to 500 psi) and good compressive strength after 24 hours.

For the medium temperature range, an optimum was discerned for compositions comprising 40.5% of orthophosphoric acid, 12.25% of phosphonate and 47.25% of retarder booster.

For improved slurry stability, in particular at the highest temperatures, the preferred retarding system of the invention also contains at least 2%, preferably 3% (with respect to the weight of dry retarder) of biopolyrners.

The retarder was prepared in the form of an aqueous solution, preferably relatively concentrated, a concentration by weight in the range 15% to 25% being a good compromise to obtain both a relatively low retarder viscosity (in particular to facilitate on-site mixing) and the possibility of using only relatively low concentrations. In the following, the concentration of retarder in the aqueous solution was fixed at 16.9%, corresponding to a density of 1.07 g/ml.

EXAMPLE 5

Table VII below shows the performance of the retarder selected following the experiments described in Example 4, namely a solution containing 16.9% of a mixture constituted by 40.5% of orthophosphoric acid, 12.25% of phosphonate and 47.25% (percentage by weight) of a retarder booster based on sodium gluconate and modified sodium lignosulfonate and adding 3% of biopolymers (with respect to the weight of retarder active matter).

For these tests, an antifoam agent was systematically used and, for low temperatures, a polynaphthalene sulfonate type dispersing agent. For tests carried out at over 100° C., the slurries were formulated with 35% of silica (percentage per weight of cement BWOC).

TABLE VII

| | | | | | | | | | |
|---|---|---|---|---|---|---|---|---|---|
| Temperature T (° C.) | 68.3 | 76.7 | 85 | 90.6 | 101.7 | 110 | 115.6 | 126.7 | 137.8 |
| Density (g/cm$^3$) | 1.893 | 1.893 | 1.893 | 1.893 | 1.893 | 1.893 | 1.893 | 1.893 | 1.893 |
| Retarder (cm$^3$/kg) | 9.9 | 10.8 | 22.5 | 40.5 | 68.7 | 81.4 | 87.3 | 119.7 | 137.7 |
| Dispersing agent (cm$^3$/kg) | 5.85 | 4.5 | 5.4 | 3.6 | — | — | — | — | — |
| Antifoam agent (cm$^3$/kg) | 2.7 | 2.7 | 2.7 | 2.7 | 2.7 | 2.7 | 2.7 | 2.7 | 2.7 |
| silica (% BWOC) | — | — | — | — | 35 | 35 | 35 | 35 | 35 |
| Rheology at 20 ° C. Viscosity (mPa · s) | 24 | 26 | 28 | 34 | 63 | 77 | 87 | 109 | 116 |
| Ty (lbf/100 ft$^2$) | 0.5 | 1.8 | 2.5 | 1.6 | 8.3 | 10 | 11 | 16 | 26 |
| Rheology at T Viscosity (mPa · s) | 14 | 14 | 16 | 35 | 36 | 40 | 45 | 62 | 59 |
| Ty (lbf/100 ft$^2$) | 3.6 | 9.5 | 5.9 | 3.7 | 5.9 | 4.5 | 7.3 | 11 | 10 |
| gel After 10 min. | 25 | 29 | 45 | 20 | 10 | 8 | 12 | 13 | 10 |
| +1 min at 3 rpm | 7 | 10 | 5 | 4 | 5.5 | 3 | 6 | 5.5 | 4 |
| Free water (ml) | 0.7 | 2 | 0.1 | 0 | 0.2 | 0.05 | 0.05 | 0.05 | 0.05 |
| Time to 100 BC (hrs:min) | 6:09 | 3:53 | 5:29 | 5:47 | 6:05 | 5:00 | 5:17 | 7:41 | 8:43 |
| Transition 30 → 100 BC (min) | 25 | 17 | 14 | 35 | 29 | 5 | 5 | 5 | 5 |
| 50 psi (hrs:min) | 11:18 | 9:19 | 8:41 | 7:55 | 8:37 | 7:36 | 7:25 | 12:11 | 14:13 |
| 500 psi (hrs:min) | 12:53 | 10:22 | 10:02 | 9:16 | 9:52 | 9:01 | 8:59 | 14:47 | 16:46 |
| CS 24 hrs (psi) | 2350 | 2587 | 2783 | 3287 | 2334 | 1948 | 1999 | 1369 | 1665 |

It can be seen that the performance obtained was highly satisfactory over the entire range of test temperatures. In particular, a very short transition time was noted between a consistency of 30 BC and 100 BC with a time period between the time to obtain 50 psi (345 kPascals) and 500 psi (3450 kPascals) generally of the order of 60–90 minutes.

EXAMPLE 6

On site, it is very difficult to adhere precisely to the prescribed additive concentrations. The usual retarders are sometimes extremely sensitive to small differences in concentration as is shown in Table VIII below, where a variation in retarder concentration of the order of only 0.2 liters per sack of cement can cause a variation in the thickening time (arbitrarily defined as the time to obtain a consistency of 100 BC) of more than 4 hours, or even more than 16 hours with certain retarders.

Further, certain conventional retarders are highly sensitive to temperature variations. As the tests carried out with a 38% refined lignosulfonate solution show, a temperature difference of the order of 10° C. can cause a variation in thickening time by a factor of 2.

By comparison, the retarder of the invention has a lower sensitivity to vaciations in concentrations and temperatures.

TABLE VIII

| T (° C.) | Retarder | Concentration (cm³/kg) | Time to 100 BC (hrs:min) |
|---|---|---|---|
| 85 | 50% solution of partially modified calcium and sodium lignosulfonate | 3.5 | 4:10 |
|  |  | 7 | 22:46 |
| 85 | 38% refined lignosulfonate solution | 3.5 | 2:26 |
|  |  | 7 | 8:23 |
| 96.1 | 38% refined lignosulfonate solution | 7.7 | 3:34 |
| 96.1 | 18% calcium glucoheptonate solution | 2.8 | 4:00 |
|  |  | 6.3 | >10:00 |
| 85 | Retarder of invention | 10.6 | 4:20 |
|  |  | 14.1 | 6:00 |
| 96.1 | Retarder of invention | 40.8 | 3:30 |
|  |  | 44.3 | 6:00 |
| 101.5 | Retarder of invention | 50 | 3:30 |
|  |  | 53.5 | 6:00 |
| 107.2 | Retarder of invention | 58.4 | 4:30 |
|  |  | 61.9 | 6:00 |

EXAMPLE 7

A further constraint is due to supplies from cement works and compositional variations which are encountered between cements from different sources.

Some conventional retarders are highly sensitive to these differences which is absolutely not the case with the retarding system of the invention, as shown in Table IX. For these tests, the temperature was fixed at 101.7° C., the slurry density at 1.89 g/cm³ and the concentration of retarder at 53.7 cm³ per kilo of cement. The slurries also contained 2.1 cm³ of antifoam agent per kilogram of cement and 35% (with respect to the weight of cement) of silica flour.

TABLE IX

| Cement type: | Dyckerhoff North | LoneStar | Saudi |
|---|---|---|---|
| Rheology at 20° C. |  |  |  |
| Viscosity (mPa · s) | 75 | 71 | 76 |
| Ty (lbf/100 ft²) | 10 | 8.5 | 15 |
| Rheology at 85° C. |  |  |  |
| Viscosity (mPa · s) | 37 | 33 | 30 |

TABLE IX-continued

| Cement type: | Dyckerhoff North | LoneStar | Saudi |
|---|---|---|---|
| Ty (lbf/100 ft²) | 6.2 | 6.5 | 8.5 |
| gel |  |  |  |
| After 10 min. | 11.5 | 15 | 29 |
| + 1 min (at 3 rpm). | 5.5 | 8 | 11 |
| Free water (ml) | traces | traces | traces |
| Time to 100 BC (hrs:min) | 6:05 | 6:20 | 5:14 |
| Transition 30 → 100 BC (min) | 29 | 8 | 33 |
| 50 psi (hrs:min) | 8:37 | 8:41 | 6:59 |
| 500 psi (hrs:min) | 9:52 | 9:59 | 9:52 |
| C.S. 24 hrs (psi) | 2334 | 2080 | 2334 |

EXAMPLE 8

This example ascertains the possibility of using a hydroxycarboxylic acid as a retarder. The preceding tests enabled the orthophosphoric acid: phosphonate: retarder booster ratio to be optimized at 60:18:22, the quantity of biopolymers remaining fixed at 3% of the quantity of dry matter in the retarder solution. Slurries were used with a density of 1.89 g/cm³, adding 2.1 cm³ of antifoam agent per kilogram of cement. For the low temperature test, a 40% polynaphthalene sufonate solution was used as the dispersing agent.

Table X, in which the concentrations of retarder are concentrations by weight with respect to the weight of cement, shows that the hydroxycarboxylic acid is perfectly suitable as a retarder booster and sometimes even produced superior results, however gelling problems were encountered with certain fluid loss control agents.

TABLE X

| Temperature: | 68.3° C. | 101.7° C. | 137.8° C. |
|---|---|---|---|
| Retarder (%) | 0.07 | 0.7 | 1 |
| Dispersing agent (polynaphtalene sufonate) (cm³/kg) | 5.6 | — | — |
| Silica flour (% BWOC) | — | 35 | 35 |
| Rheology at 20° C. |  |  |  |
| Viscosity (mPa · s) | 22 | 62 | 70 |
| Ty (lbf/100 ft²) | 1.6 | 9 | 12 |
| Rheology at T° C. |  |  |  |
| Viscosity (mPa · s) | 14 | 34 | 31 |
| Ty (lbf/100 ft²) | 6.1 | 10 | 14 |
| gel |  |  |  |
| After 10 min. | 15 | 20 | 18 |
| + 1 min (at 3 rpm). | 4 | 11 | 6 |
| Free water (ml) | 2 | 0.6 | 0.35 |
| Time to 100 BC (hrs:min) | 5:38 | 6:01 | 5:23 |
| Transition 30 → 100 BC (min) | 17 | 30 | 9 |
| 50 psi (hrs:min) | 10:28 | 8:48 | 8:56 |
| 500 psi (hrs:min) | 11:45 | 10:02 | 10:37 |
| C.S. 24 hrs (psi) | 2471 | 2472 | 3152 |

EXAMPLE 9

This example ascertains that a mixture of a hydroxycarboxylic acid and a lignosulfonate can be used as a retarding agent. All of the tests were carried out at 137.8° C., with a slurry with a density of 1.89 g/cm³, adding 2.1 cm³ of antifoam agent per kilogram of cement and 35% of silica flour (BWOC). The performance obtained (Table XI) was again very satisfactory.

TABLE XI

| H$_3$PO$_4$/Phosphonate/retarder booster: | 60/18/22 | 60/18/22 | 40.5/12.5/47.2 | 40.5/12.5/47.2 |
|---|---|---|---|---|
| Retarder (%) | 1 | 2 | 0.7 | 1 |
| Rheology at 20° C. | | | | |
| Viscosity (mPa · s) | 83 | 123 | 72 | 84 |
| Ty (lbf/100 ft$^2$) | 19 | 33 | 14 | 12 |
| Rheology at 85° C. | | | | |
| Viscosity (mPa · s) | 43 | 58 | 36 | 40 |
| Ty (lbf/100 ft$^2$) gel | 19 | 25 | 12 | 13 |
| After 10 min. | 49 | 23 | 17 | 15 |
| + 1 min (at 3 rpm) | 12 | 19 | 11 | 9 |
| Free water (ml) | 2.5 | 0 | 1.2 | 0.5 |
| Time to 100 BC (hrs:min) | 1:03 | 3:19 | 3:24 | 9:17 |
| Transition 30 → 100 BC (min) | 3 | 4 | 5 | 6 |
| 50 psi (hrs:min) | not measured | 7:43 | not measured | 11:20 |
| 500 psi (hrs:min) | | 8:55 | | 13:20 |
| C.S. 24 hrs (psi) | | 4115 | | 2972 |

EXAMPLE 10

Since the optimized retarding system of Example 5 was particularly optimized for low temperatures, it was ascertained that it could also be used with a slurry containing plaster, more particularly used for deepwater drilling at very low temperature. The slurries, tested at 20° C., had a density of 1.89 g/cm$^3$, contained 5.3 cm$^3$ of antifoam agent per kilolgram of cement, 7 cm$^3$ (per kilo of cement) of dispersing agent (polynaphthalene sufonate in 40% solution) and 150% of plaster (with respect to the weight of cement).

TABLE XII

| Retarder concentration (cm$^3$ per kilo of cement): | 28.1 | 42.2 | 28.1 |
|---|---|---|---|
| Rheology after mixing at 20° C. | | | |
| Viscosity (mPa · s) | 99 | 119 | 99 |
| Yield point Ty (lbf/100 ft$^2$) | 6.0 | 11.0 | 6.0 |
| Rheology after completion at 20° C. | | | |
| Viscosity (mPa · s) | 113 | 134 | 149 |
| Yield point Ty (lbf/100 ft$^2$) gel | 6.0 | 8.0 | 7.1 |
| After 10 min. | 13 | 19 | 16 |
| + 1 min (at 3 rpm) | 9 | 10 | 9 |
| Free water (ml) | 0 | 0 | 0 |
| Time to 100 BC (hrs:min) | 2:05 | 4:30 | 2:18 |
| Transition 30 → 100 BC (min) | 30 | 56 | 15 |
| Compressive strength (psi) | | | |
| After 5 h | — | 830 | 889 |
| After 8 h | — | 735 | — |
| After 2 days | — | 1079 | 822 |

TABLE XII-continued

| Retarder concentration (cm$^3$ per kilo of cement): | 28.1 | 42.2 | 28.1 |
|---|---|---|---|
| After 3 days | — | 1517 | 983 |
| After 7 days | — | 1982 | 1783 |

The retarding system of the invention enabled a compressive strength of more than 500 psi to be obtained after only 5 hours, with a thickening time of 4:30 at 20° C. and 2:18 at only 10° C. This shows good development of compressive strength.

EXAMPLE 11

This retarding system was also tested at 20° C. for systems based exclusively on plaster (Table XIII). The system density was 1.8 g/cm$^3$, comprised 2.1 cm$^3$ of antifoam agent per kilogram of plaster and 3.5 cm$^3$ of retarder per kilo of plaster.

TABLE XIII

| Rheology after mixing at 20° C. | |
|---|---|
| Viscosity (mPa · s) | 84 |
| Yield pointTy (lbf/100 ft$^2$) | 22 |
| Rheology after completion at 20° C. | |
| Viscosity (mPa · s) | 61 |
| Yield pointTy (lbf/100 ft$^2$) gel | 14 |
| After 10 min. | 14 |
| + 1 min (at 3 rpm). | 8 |
| Free water (ml) | 0 |
| Time to 100 BC (hrs:min) | 3:40 |
| Transition 30 → 100 BC (min)) | 5 |

It can be seen that the retarding system of the invention is also capable of retarding a system based exclusively on plaster.

EXAMPLE 12

The Dequest 2047 system was replaced by the pentasodium salt of ethylenediamine tetra(methylenephosphonic) acid, commercially available from Monsanto under the trade name Dequest 2046. The retarder was constituted by a 17.5% solution of a mixture of 38.8% of orthophosphate, 15.97% of phosphonate and 45.25% of retarder booster (percentages by weight) and 2.87% of biopolymers (with respect to the weight of retarder active matter). The slurry density was 1.893 g/cm$^3$, comprising 35% (by weight of cement) of silica flour and containing 3 cm$^3$ of antifoam agent per kilogram of cement, the concentration of retarding agent being 68.4 cm$^3$ per kilogram of cement. The measurements were carried out at 101.7° C.

The performances indicated in Table XIV are remarkable; the very long thickening time should in particular be noted, but the transition time was only 36 minutes and the compressive strength developed very rapidly. The absence of calcium thus appears to have a favorable effect.

TABLE XIV

| Rheology after mixing at 20° C. | |
|---|---|
| Viscosity (mPa · s) | 89 |
| Yield pointTy (lbf/100 ft²) | 9 |
| Rheology at 85° C. | |
| Viscosity (mPa · s) | 47 |
| Yield pointTy (lbf/100 ft²) | 6 |
| Gel | |
| After 10 min/+1 min at 3 rpm. | 7/2.5 |
| Free water (ml) | 0.05 |
| Time to 100 BC (hrs:min) | 14:26 |
| Transition 30 → 100 BC (min)) | 36 |
| Time to 50 psi (hrs:min) | 14:33 |
| Time to 500 psi (hrs:min) | 15:54 |
| CS after 24 hours | 21.07 MPa (3057 psi) |

EXAMPLE 13

Based on example 12, the retarding system constituted by the pentasodium salt of ethylenediamine N,N,N',N4 tetramethylene phosphonic acid (EDTMP) and phosphoric acid has been further studied.

Cement slurries have been prepared following the API procedure using a cement from Dyckerhoff (North, Black Label), a dispersing agent (0.03 gal/sk, 2.66 ml/kg of cement), an anti-foam agent (0.03 gal/sk, 2.66 ml/kg of cement), 35% of silica flour (BWOC) and the retarding system EDTMP acid/phosphoric acid (0.2gal/sk, 17,77 ml/kg of cement for the tests reported table XV and 0.4 gal/sk, 35,51ml/kg of cement for the tests reported table XVI below).

A water solution of pentasodium EDTMPS salt is used and has an active material contenftbf 25 wt. %. The phosphoric acid is a 85% solution. The different ratios for EDTMP acid/phosphoric acid that have been tested are based on a 30 wt. % retarder concentration in water solution. The ratios have been calculated using the mathematical system below:

$$\begin{cases} \dfrac{0.25x}{0.85y} = z \\ x + y = 30 \end{cases}$$

where x is the concentration of EDTMP acid in wt. %, y is the concentration of the phosphoric acid in wt. % and z the desired ratio EDTMP acid/phosphoric acid.

TABLE XV

| z | 0.4 | 0.50 | 0.59 | 0.70 | 0.8 | 0.9 |
|---|---|---|---|---|---|---|
| Mixing rheology | | | | | | |
| Pv (mPa · s) | 47 | 42 | 38 | 40 | 39 | 43 |
| Ty lbf/100 sqft | 13 | 6 | 5 | 6 | 6 | 6 |
| 10"gel (lbf/100 sqft) | 10 | 5 | 5 | 6 | 6 | 6 |
| API rheology @ 85° C. | 32 | 37 | 32 | 28 | 41 | 39 |
| PV(mPa · s) | | | | | | |
| Ty | 18 | 26 | 37 | 32 | 23 | 25 |
| 10" gel | 9 | 11 | 12 | 14 | 11 | 12 |
| 10'gel/1'stirring | 18/13 | 12/9 | 14/13 | 12/7 | 10/7 | 11/8 |
| API Free water (ml) | 6.7 | 3.0 | 4.3 | 3.6 | 3.2 | 2.6 |
| Thickening Time @ 85° C. | | | | | | |
| Time to 100 BC (hrs:min) | 1:56 | 8:52 | 8:44 | 11:33 | 15:38 | >15.5 h |
| Transition 30 → 100 (hrs:min) | 0:22 | 0:35 | 0:53 | 0:58 | 1:06 | — |
| Thickening Time @ 104.4° C. | | | | | | |
| Time to 100 BC (hrs:min) | 1:00 | 1:37 | 2:30 | 3:40 | 3:54 | 5:51 |
| Transition 30 → 100 (hrs:min) | 0:15 | 0:16 | 0:23 | 0:25 | 0:30 | 0:45 |

TABLE XVI

| z | 0.50 | 0.59 | 0.70 | 0.8 | 0.9 |
|---|---|---|---|---|---|
| Mixing rheology | | | | | |
| Pv (mPa · s) | 41 | 42 | 39 | 43 | 42 |
| Ty lbf/100 sqft | 3 | 4 | 4 | 4 | 6 |
| 10"gel (lbf/100 sqft) | 4 | 4 | 4 | 5 | 6 |
| API rheology @ 85° C. | | | | | |
| PV(mPa · s) | 23 | 27 | 27 | 24 | 26 |
| Ty | 13 | 18 | 19 | 19 | 19 |
| 10" gel | 7 | 8 | 8 | 10 | 10 |
| 10'gel/1'stirring | 13/9 | 15/13 | 16/11 | 10/8 | 12/10 |
| API Free water (ml) | 18 | 8 | 7.5 | 5.3 | 6 |
| Thickening Time @ 104.4° C. | | | | | |
| Time to 100 BC (hrs:min) | 7:11 | 9:30 | 10:43 | 12:04 | 13:22 |
| Transition 30 → 100 (hrs:min) | 0:20 | 0:23 | 0:27 | 0:22 | 2:57 |

From table XV and XVI, trends can be observed. First, as the ratio of EDTMP acid increases from 0.4 to 0.9, the thickening time increases. Second, the free water decreases with increasing EDTMP acid ratio. Third, the absolute transition time from 30 bc to 100 bc increases as the EDTMP acid ratio increases. However, if the transition time is calculated as a percentage of the thickening time a decrease is observed with increasing EDTMP acid ratio in the range from 0.4 to 0.8.

At an EDTMP acid ratio of 0.9 at 104.4° C. (220° F.) and 36 cm³/kg (0.4 gal/sk), the cement set is poor with a low strength. The set cement at this condition could be broken with the force of the hands. An important observation is that all other samples have shown a "true" and hard set that was difficult to clean out from the consistometer test cell.

Best results are obtained with a ratio ranging between 0.6 and 0.8, preferably of about 0.7, a good compromise between the thickening time and the amount of produced free water, and a ratio which also assure that the retarder is efficient event at high concentration without 'killing' the cement.

TABLE IV

| Test No | Concentration % | T (°C.) | Phosphonate % | H₃PO₄ % | Thickening time hrs:min | Transition time min. | Strength 50 psi hrs:min | Strength 500 psi hrs:min | after 24 hours psi | Rheology on mixing PV | Rheology on mixing Ty | Rheology at circulation temperature PV | Rheology at circulation temperature Ty | Gel at 10 min | Gel +1 min | Free water ml |
|---|---|---|---|---|---|---|---|---|---|---|---|---|---|---|---|---|
| 1 | 0.5 | 79.5 | 16 | 36 | 20:54 | 45 | 23:10 | 27:19 | 0 | 57 | 2.2 | 34 | 4.1 | 21 | 6 | 0 |
| 2 | 0 | 79.5 | 16 | 36 | 3:41 | 31 | 8:33 | 10:06 | 1825 | 57 | 3.1 | 31 | 6.9 | 37 | 10 | 0 |
| 3 | 0.375 | 90.5 | 16 | 36 | 3:23 | 50 | 7:20 | 8:39 | 2483 | 59 | 2.6 | 38 | 6.3 | 52 | 15 | 0 |
| 4 | 0.125 | 68.3 | 16 | 36 | 10:56 | 30 | 20:28 | 23:23 | 510 | 57 | 3.5 | 37 | 4.8 | 19 | 7 | 0 |
| 5 | 0.375 | 68.3 | 16 | 36 | 29:15 | 26 | 41:02 | 45:25 | 0 | 58 | 3 | 32 | 3.6 | 14 | 3 | 0 |
| 6 | 0.125 | 90.5 | 16 | 36 | 2:30 | 45 | 7:33 | 8:56 | 2497 | 48 | 1.5 | 26 | 16 | 98 | 27 | 0 |
| 7 | 0.375 | 83 | 31 | 36 | 9:41 | 17 | 15:12 | 19:10 | 1348 | 36 | 3.3 | 33 | 6.4 | 31 | 13 | 0 |
| 8 | 0.125 | 75.8 | 1 | 36 | 13:03 | 26 | 22:19 | 24:44 | 0 | 62 | 3.6 | 37 | 5.3 | 26 | 8.5 | 0 |
| 9 | 0.375 | 75.8 | 1 | 36 | 34:56 | 56 | 35:24 | 41:00 | 0 | 60 | 3.4 | 35 | 6.2 | 12 | 5.5 | 0 |
| 10 | 0.250 | 86.7 | 1 | 36 | 12:34 | 32 | 8:06 | 9:31 | 2931 | 62 | 2.6 | 38 | 18 | 112 | 36 | 0 |
| 11 | 0.125 | 83 | 31 | 36 | 9:32 | 78 | 10:25 | 12:13 | 2062 | 51 | 2.2 | 51 | 6.6 | 65 | 14 | 0 |
| 12 | 0.250 | 72 | 31 | 36 | 25:50 | 60 | 30:58 | 34:49 | 0 | 54 | 5.6 | 37 | 5.9 | 20 | 8.5 | 0 |
| 13 | 0.375 | 83 | 19.75 | 62 | 3:27 | 24 | 8:24 | 10:12 | 2300 | 58 | 4.7 | 42 | 16 | 64 | 29 | 0 |
| 14 | 0.125 | 75.8 | 12.25 | 10 | 18:00 | 34 | 33:34 | 36:41 | 0 | 56 | 2.3 | 34 | 6.2 | 26 | 9.5 | 0 |
| 15 | 0.375 | 75.8 | 12.25 | 10 | 64:40 | 60 | >8 days | >8 days | 0 | 62 | 2.4 | 42 | 5.8 | 34 | 11 | 0 |
| 16 | 0.250 | 86.7 | 12.25 | 10 | 35:43 | 60 | 26:10 | 32:36 | 32 | 56 | 3 | 49 | 25 | 144 | 50 | 0 |
| 17 | 0.250 | 79.5 | 27.25 | 10 | 54:38 | 60 | >8 days | >8 days | 0 | 58 | 4 | 36 | 6.3 | 29 | 9 | 0 |
| 18 | 0.125 | 83 | 19.75 | 62 | 2:10 | 54 | 8:26 | 10:06 | 2142 | 53 | 2.2 | 34 | 13 | 101 | 24 | 0 |
| 19 | 0.250 | 72 | 19.75 | 62 | 7:02 | 33 | 9:49 | 12:15 | 1650 | 55 | 6.5 | 41 | 7.4 | 39 | 13 | 0 |
| 20 | 0.250 | 79.5 | 4.75 | 62 | 5:14 | 41 | 10:33 | 12:33 | 2010 | 58 | 1.5 | 35 | 6.1 | 28 | 11 | 0 |
| 21 | 0.250 | 79.5 | 16 | 36 | 12:18 | 34 | 21:47 | 25:38 | 480 | 47 | 5.3 | 39 | 8.7 | 27 | 12 | 0 |
| 22 | 0.250 | 79.5 | 16 | 36 | 12:26 | 24 | 16:10 | 18:36 | 1344 | 60 | 2.1 | 37 | 6.6 | 39 | 13 | 0 |
| 23 | 0.250 | 79.5 | 16 | 36 | 12:24 | 23 | 19:18 | 22:27 | 824 | 49 | 3.6 | 33 | 5.7 | 27 | 10 | 0 |

TABLE V

| Test No | Concentration % | T (°C.) | Phosphonate % | H₃PO₄ % | Thickening time hrs:min | Transition time min. | Strength 50 psi hrs:min | Strength 500 psi hrs:min | after 24 hours psi | Rheology on mixing PV | Rheology on mixing Ty | Rheology at circulation temperature PV | Rheology at circulation temperature Ty | Gel at 10 min | Gel +1 min | Free water ml |
|---|---|---|---|---|---|---|---|---|---|---|---|---|---|---|---|---|
| 1 | 1.5 | 101.7 | 16 | 36 | 16:53 | 60 | 17:01 | 19:26 | 1144 | 112 | 10 | 69 | 9 | 14 | 7.5 | 0.05 |
| 2 | 0.7 | 101.7 | 16 | 36 | 2:54 | 28 | 7:22 | 8:21 | 2769 | 103 | 23 | 53 | 23 | 58 | 34 | 0.2 |
| 3 | 1.3 | 112.8 | 16 | 36 | 3:26 | 20 | 8:00 | 9:44 | 2676 | 96 | 15 | 61 | 11 | 11.5 | 6 | 0.05 |
| 4 | 0.9 | 42.2 | 16 | 36 | 15:27 | 36 | 12:45 | 14:48 | 1927 | 100 | 18 | 57 | 21 | 6 | 9.5 | 0 |
| 5 | 1.3 | 42.2 | 16 | 36 | 35:43 | 22 | 37:00 | 39:00 | 2 | 101 | 17 | 56 | 13 | 15 | 10 | 0.1 |
| 6 | 0.9 | 112.8 | 16 | 36 | 1:42 | 15 | 5:50 | 7:04 | 2941 | 100 | 19 | 69 | 33 | 27.5 | 7.5 | 0.1 |
| 7 | 1.3 | 105.6 | 31 | 36 | 9:04 | 18 | 14:01 | 17:00 | 1750 | 82 | 14 | 51 | 14 | 19 | 10 | 0.05 |
| 8 | 0.9 | 97.8 | 1 | 36 | 8:39 | 40 | 13:47 | 15:13 | 2005 | 101 | 16 | 54 | 13 | 15 | 9 | 0.5 |
| 9 | 1.3 | 97.8 | 1 | 36 | 33:11 | 50 | 37:23 | 40:11 | 20 | 109 | 15 | 60 | 10 | 8 | 5 | 0.05 |
| 10 | 1.1 | 108.9 | 1 | 36 | 5:30 | 21 | 11:12 | 13:05 | 2323 | 95 | 13 | 57 | 9 | 9 | 4 | 0.1 |
| 11 | 0.9 | 105.6 | 31 | 36 | 5:37 | 200 | 6:45 | 8:23 | 2249 | 95 | 20 | 45 | 30 | 85 | 17 | 0.05 |
| 12 | 1.1 | 94.4 | 31 | 36 | 26:06 | 100 | 33:56 | 39:00 | 0 | 90 | 12 | 60 | 22 | 44 | 22 | 0 |
| 13 | 1.3 | 105.6 | 19.75 | 54 | 2:19 | 21 | 5:29 | 6:32 | 2400 | 95 | 20 | 60 | 15 | 24 | 12 | 0 |
| 14 | 0.9 | 97.8 | 12.25 | 18 | 20:37 | 120 | 38:32 | 42:16 | 0 | 102 | 15 | 60 | 12 | 15 | 7 | 0 |
| 15 | 1.3 | 97.8 | 12.25 | 18 | 26:28 | 180 | 80:43 | 87:30 | 0 | 103 | 9 | 58 | 5 | 5 | 4.5 | 0.5 |
| 16 | 1.1 | 108.9 | 12.25 | 18 | 4:10 | 4 | 18:34 | 21:28 | 0 | 100 | 9.5 | 55 | 6 | 9 | 5 | 0 |
| 17 | 1.1 | 101.7 | 27.25 | 18 | 30:18 | 22 | 42:10 | 49:13 | 0 | 98 | 12 | 64 | 9 | 20 | 9 | 0 |
| 18 | 0.9 | 105.6 | 19.75 | 54 | 1:46 | 13 | 4:35 | 5:51 | 2700 | 100 | 25 | 57 | 21 | 31 | 15 | 0 |
| 19 | 1.1 | 94.4 | 19.75 | 54 | 4:12 | 25 | 8:26 | 10:07 | 2200 | 101 | 23 | 57 | 24 | 60 | 14 | 0 |
| 20 | 1.1 | 101.7 | 4.75 | 54 | 3:10 | 24 | 5:45 | 6:54 | 2468 | 89 | 19 | 61 | 16 | 15 | 9 | 0 |
| 21 | 1.1 | 101.7 | 16 | 36 | 6:31 | 37 | 8:26 | 9:32 | 2652 | 93 | 12 | 54 | 10 | 18 | 8 | 0 |
| 22 | 1.1 | 101.7 | 16 | 36 | 5:58 | 33 | 10:12 | 11:33 | 2300 | 103 | 16 | 56 | 14 | 17 | 14 | 0.2 |
| 23 | 1.1 | 101.7 | 16 | 36 | 5:27 | 47 | 10:05 | 11:36 | 2180 | 94 | 16 | 55 | 13 | 13 | 10 | 0.2 |

TABLE VI

| Test No | Concentration % | T (° C.) | Phosphonate % | $H_3PO_4$ % | Thickening time hrs:min | Transition time min. | 50 psi hrs:min | 500 psi hrs:min | Strength after 24 hours psi | Rheology on mixing PV | Rheology on mixing Ty | Rheology at circulation temperature PV | Rheology at circulation temperature Ty | Gel at 10 min | Gel +1 min | Free water ml |
|---|---|---|---|---|---|---|---|---|---|---|---|---|---|---|---|---|
| 1 | 3 | 126.7 | 16 | 36 | 18:38 | 24 | 24:38 | 27:47 | 50 | 134 | 18 | 69 | 73 | 75 | 2 | 0.05 |
| 2 | 1.5 | 126.7 | 16 | 36 | 3:07 | 4 | 5:31 | 6:50 | 2399 | 112 | 14 | 73 | 12 | 10 | 5 | 0.05 |
| 3 | 2.625 | 137.8 | 16 | 36 | 6:55 | 13 | 9:47 | 12:11 | 2150 | 129 | 11 | 72 | 6.6 | 6.5 | 2.5 | 0.1 |
| 4 | 1.875 | 115.6 | 16 | 36 | 9:58 | 15 | 10:11 | 11:50 | 2563 | 101 | 13 | 61 | 8 | 8 | 3 | 0.3 |
| 5 | 2.625 | 115.6 | 16 | 36 | 30:52 | 45 | 23:11 | 27:32 | 50 | 129 | 11 | 72 | 6.6 | 6.5 | 2.5 | 0.1 |
| 6 | 1.875 | 137.8 | 16 | 36 | 2:15 | 18 | 5:56 | 7:32 | 2550 | 93 | 14 | 49 | 10 | 9.5 | 1 | 0.05 |
| 7 | 2.625 | 130.6 | 31 | 36 | 4:12 | 21 | 10:21 | 15:04 | 2572 | 119 | 16 | 56 | 11 | 8.5 | 2 | 0.1 |
| 8 | 1.875 | 122.8 | 1 | 36 | 6:58 | 4 | 11:11 | 13:18 | 2640 | 92 | 12 | 48 | 7.6 | 8 | 1 | 0.5 |
| 9 | 2.625 | 122.8 | 1 | 36 | 29:18 | 25 | 32:14 | 38:51 | 0 | 106 | 15 | 52 | 7.6 | 8 | 1 | 0.1 |
| 10 | 2.250 | 133.9 | 1 | 36 | 7:09 | 5 | 7:02 | 8:18 | 3484 | 103 | 14 | 54 | 8.5 | 8.5 | 1.5 | 0.1 |
| 11 | 1.875 | 130.6 | 31 | 36 | 4:35 | 40 | 6:44 | 9:15 | 2393 | 103 | 13 | 63 | 9.7 | 14 | 7 | 0 |
| 12 | 2.25 | 119.4 | 31 | 36 | 7:00 | 40 | 14:02 | 18:23 | 1042 | 125 | 18 | 70 | 13 | 11 | 7 | 0 |
| 13 | 2.625 | 130.6 | 19.75 | 46 | 2:57 | 20 | 6:41 | 7:53 | 1100 | 111 | 22 | 67 | 10 | 8 | 5 | 0 |
| 14 | 1.875 | 122.8 | 12.25 | 26 | 11:42 | 6 | 13:47 | 16:37 | 2052 | 106 | 13 | 58 | 4.6 | 8 | 2 | 0.5 |
| 15 | 2.625 | 122.8 | 12.25 | 26 | 22:24 | 5 | 42:41 | 47:39 | 0 | 97 | 13 | 45 | 8 | 10 | 6 | 0.05 |
| 16 | 2.250 | 133.9 | 12.25 | 26 | 7:18 | 21 | 11:12 | 13:27 | 1813 | 101 | 14 | 44 | 9.8 | 9.5 | 15 | 0.05 |
| 17 | 2.250 | 126.7 | 27.25 | 26 | 11:39 | 42 | 16:29 | 24:8 | 490 | 93 | 11 | 54 | 6 | 5.5 | 2 | 0.05 |
| 18 | 1.875 | 130.6 | 19.75 | 46 | 2:05 | 17 | 5:50 | 7:08 | 2891 | 122 | 17 | 73 | 13 | 11.5 | 16 | 0.05 |
| 19 | 2.250 | 119.4 | 19.75 | 46 | 5:00 | 23 | 8:23 | 9:59 | 2733 | 117 | 24 | 73 | 12 | 19 | 5 | 0 |
| 20 | 2.250 | 126.7 | 4.75 | 46 | 11:01 | 17 | 13:49 | 15:33 | 2213 | 135 | 19 | 61 | 1.7 | 6 | 2 | 0.6 |
| 21 | 2.250 | 126.7 | 16 | 36 | 6:37 | 18 | 9:59 | 12:16 | 2521 | 94 | 11 | 54 | 6 | 7.5 | 2 | 0 |
| 22 | 2.250 | 126.7 | 16 | 36 | 5:07 | 22 | 11:28 | 13:38 | 2161 | 103 | 12 | 61 | 5 | 6.5 | 2 | 0.05 |
| 23 | 2.250 | 126.7 | 16 | 36 | 7:53 | 20 | 4:55 | 17:21 | 1794 | 101 | 17 | 51 | 9 | 2 | 1 | 0.05 |

What is claimed is:

1. A retarding system for a well cementing slurry, the system comprising a solution containing:

a) a methyl phosphonic acid derivative phosphonate; and
   b) a phosphate.

2. A retarding system according to claim 1, wherein the phosphate selected from the group consisting of monophosphates, ortho-phosphates $PO_4^2$, meta-phosphates $PO_3$, acyclic poly-phosphates, pyrophosphates $P_2O_7^4$, tripoly-phosphates $P_3O_{10}^5$, and cyclic poly-phosphates.

3. A retarding system according to claim 1, wherein the phosphate is selected from the group consisting of orthophosphoric acid $H_3PO_4$, sodium dihydrogen phosphate $NaH_2PO_4$, sodium monohydrogen phosphate $Na_2HPO_4$, trisodium phosphate $Na_3PO_4$, pyrophosphoric acid $H_4P_2O_7$, sodium tripolyphosphate $Na_5P_3O_{10}$, and sodium cyclotrimetaphosphate $Na_3P_3O_9$.

4. A retarding system according to claim 1, wherein the methylene phosphonic acid derivative phosphonate is selected from the group consisting of calcium and sodium salts of ethylenediamine-N,N,N',N'-tetrakis(methylene) phosphonic acid, and the pentasodium salt of ethylenediamine tetra(methylenephosphonic) acid.

5. A retarding system according to claim 3, wherein the phosphate is orthophosphoric acid $H_3PO_4$.

6. A retarding system according to claim 1, wherein the solution has a, phosphonate to phosphate ratio in the range 2 to 4 by weight.

7. A retarding system according to claim 1, further comprising a retarder booster selected from the group consisting of lignosulfonates, hydroxycarboxylic acids, and mixtures thereof.

8. A retarding system according to claim 1, further comprising a biopolymer.

9. A retarding system according to claim 7, comprising:

a) 40% to 45% by weight of orthophosphoric acid,
   b) 10% to 15% by weight of the calcium and sodium salt of ethylenediamine-N,N,N',N'-tetrakis(methylene) phosphonic acid, and
   c) 40% to 50% by weight of retarder booster.

10. A retarding system according to claim 1, comprising the pentasodium salt of ethylenediamine N,N,N',N4 tetramethylene phosphonic acid (EDTMP) and phosphoric acid.

11. A retarding system according to claim 10, wherein the weight ratio EDTMP/phosphoric acid is between 0.6 and 0.8.

12. A retarding system as claimed in claim 6, wherein the solution has a phosphonate to phosphate ratio in the range 3 to 3.5 by weight.

13. A retarding system as claimed in claim 11, wherein the weights ratio EDTMP/phosphoric acid is about 0.7.

14. A retarded well cement system for use at a temperature in the range 70° C. to 140° C., comprising:

i) cement;
   ii) water;
   iii) a phosphonate derived from methyl phosphonic acid; and
   iv) a phosphate.

15. A retarded well cement system as claimed in claim 14, wherein the cement is selected from the group consisting of Portland cement and plaster-based cement systems.

16. A retarded well cement system as claimed in claim 14, further comprising a retarder booster selected from the group consisting of lignosulfonates, hydroxycarboxylic acids, and mixtures thereof.

17. A retarded well cement system as claimed in claim 14, further comprising a biopolymer.

18. A retarded well cement system as claimed in claim 14, wherein the phosphonate to phosphate ratio lies in the range 2 to 4 by weight.

19. A retarded well cement system as claimed in claim 14, wherein the phosphate is selected from the group consisting of mono-phosphates, ortho-phosphates $PO_4^2$, meta-phosphates $PO_3$, acyclic poly-phosphates, pyrophosphates $P_2O_7^4$, tripolyphosphates $P_3O_{10}^5$, and cyclic poly-phosphates.

20. A retarded well cement system as claimed in claim 14, wherein the methylene phosphonic acid derivative phosphonate is selected from the group consisting of calcium and sodium salts of ethylenediamine-N,N,N',N'-tetrakis (methylene) phosphonic acid, and the pentasodium salt of ethylenediamine tetra(methylenephosphonic) acid.

* * * * *